United States Patent
Prakash et al.

(10) Patent No.: US 11,061,800 B2
(45) Date of Patent: Jul. 13, 2021

(54) OBJECT MODEL BASED ISSUE TRIAGE

(71) Applicant: MICROSOFT TECHNOLOGY LICENSING, LLC, Redmond, WA (US)

(72) Inventors: Rama Krishna Prasad Kasapura Satya Prakash, Redmond, WA (US); Mei-Hsuan Lu, Bellevue, WA (US); Arihant Nahata, Bellevue, WA (US); Diego Villasenor, Woodinville, WA (US); Siddharth Deepak Mehta, Kirkland, WA (US); Pritesh Kanani, Redmond, WA (US); William Edward Miao, Bellevue, WA (US); Rajasekaran Subramanian, Redmond, WA (US); Sivakumar Gobichettypalayam Ananthakrishnan, Redmond, WA (US); Yong Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/428,928

(22) Filed: May 31, 2019

(65) Prior Publication Data

US 2020/0379871 A1 Dec. 3, 2020

(51) Int. Cl.
*G06F 9/44* (2018.01)
*G06F 11/34* (2006.01)
(Continued)

(52) U.S. Cl.
CPC ........ *G06F 11/3476* (2013.01); *G06F 11/079* (2013.01); *G06F 11/366* (2013.01);
(Continued)

(58) Field of Classification Search
CPC .......................... G06F 11/3476; G06F 11/3447
(Continued)

(56) References Cited

U.S. PATENT DOCUMENTS

| 7,263,632 | B2 * | 8/2007 | Ritz | G06F 11/0709 |
| | | | | 714/25 |
| 7,373,552 | B2 * | 5/2008 | Bjorsne | G06F 11/0748 |
| | | | | 714/37 |

(Continued)

FOREIGN PATENT DOCUMENTS

WO 2014120192 A1 8/2014

OTHER PUBLICATIONS

Julen Kahles et al.; "Automating Root Cause Analysis via Machine Learning in Agile Software Testing Environments"; 2019 12th IEEE Conference on Software Testing, Validation and Verification (ICST)—2019 IEEE.*

(Continued)

*Primary Examiner* — Francisco J Aponte
(74) *Attorney, Agent, or Firm* — Newport IP, LLC; David W. Foster

(57) ABSTRACT

Technologies for assigning a user-generated issue report to an appropriate team for investigation are disclosed. A log file associated with an issue report is parsed to create an object model. The object model is a hierarchy of objects containing data emitted over time by a computer application associated with the issue report. Rules analyze the content of the object model, and when a rule is satisfied, the issue report is assigned to a team associated with the rule for investigation. Rules may access objects in the object model on a per-component level, thereby allowing issues to be assigned to teams at the level of individual components. Rules may also perform a root cause analysis of the issue based on the object model.

18 Claims, 11 Drawing Sheets

(51) Int. Cl.
*G06F 40/205* (2020.01)
*G06F 11/07* (2006.01)
*G06F 11/36* (2006.01)

(52) U.S. Cl.
CPC ...... *G06F 11/3664* (2013.01); *G06F 11/3692* (2013.01); *G06F 40/205* (2020.01)

(58) Field of Classification Search
USPC .......................................................... 717/128
See application file for complete search history.

(56) References Cited

U.S. PATENT DOCUMENTS

| | | | |
|---|---|---|---|
| 7,865,457 B2 | 1/2011 | Ravin et al. | |
| 9,098,290 B2* | 8/2015 | Chithambaram | G06F 8/35 |
| 9,122,602 B1* | 9/2015 | Jewell | G06F 11/079 |
| 9,244,822 B2* | 1/2016 | Tamilmani | H04L 67/1097 |
| 9,367,383 B2* | 6/2016 | Henley | G06F 8/60 |
| 9,633,106 B1* | 4/2017 | Saurabh | G06F 16/355 |
| 10,089,169 B2* | 10/2018 | Adinarayan | G06F 11/0709 |
| 10,204,030 B1* | 2/2019 | Hockett | G06F 11/3624 |
| 10,303,533 B1* | 5/2019 | Panov | G06F 11/3452 |
| 10,331,542 B2* | 6/2019 | Iyer | G06F 11/3636 |
| 10,474,519 B2* | 11/2019 | Talwadker | H04L 41/0645 |
| 10,579,928 B2* | 3/2020 | Wang | G06F 11/008 |
| 10,606,730 B2* | 3/2020 | Vent | G06F 11/0706 |
| 10,771,314 B2* | 9/2020 | Misra | H04L 41/5074 |
| 10,824,974 B2* | 11/2020 | Arora | G06Q 10/063114 |
| 2005/0091098 A1 | 4/2005 | Brodersen et al. | |
| 2007/0179831 A1 | 8/2007 | Patnaik et al. | |
| 2010/0287416 A1* | 11/2010 | Shacham | G06F 11/079 714/39 |
| 2010/0318846 A1* | 12/2010 | Sailer | G06F 11/079 714/26 |
| 2011/0083123 A1* | 4/2011 | Lou | G06F 11/0706 717/125 |
| 2012/0151278 A1 | 6/2012 | Tsantilis | |
| 2013/0136250 A1 | 5/2013 | Saushkin | |
| 2014/0006000 A1* | 1/2014 | Said | G06F 11/3419 703/22 |
| 2014/0122143 A1 | 5/2014 | Fletcher et al. | |
| 2014/0188538 A1 | 7/2014 | Dasgupta et al. | |
| 2014/0324865 A1* | 10/2014 | Mizutani | G06F 11/0703 707/737 |
| 2015/0347214 A1* | 12/2015 | Samuni | G06F 11/0751 714/37 |
| 2016/0098342 A1* | 4/2016 | Faizanullah | H04L 67/34 717/131 |
| 2016/0124823 A1* | 5/2016 | Ruan | G06F 11/0709 714/26 |
| 2016/0224402 A1* | 8/2016 | Togawa | G06F 11/0778 |
| 2016/0350170 A1* | 12/2016 | Hermany | G06F 11/3476 |
| 2017/0091008 A1* | 3/2017 | Cherbakov | H04L 43/0864 |
| 2017/0132181 A1* | 5/2017 | Van As | G06F 11/3476 |
| 2017/0139806 A1* | 5/2017 | Xu | G06F 11/0766 |
| 2017/0153936 A1* | 6/2017 | Vorganti | G06F 11/079 |
| 2017/0315683 A1* | 11/2017 | Boucher | G06F 3/0486 |
| 2018/0174065 A1* | 6/2018 | Debnath | G06F 11/3476 |
| 2018/0307551 A1* | 10/2018 | Bacha | G06N 3/084 |
| 2019/0058642 A1* | 2/2019 | Vangala | G06F 11/3452 |
| 2019/0065343 A1* | 2/2019 | Li | G06N 3/088 |
| 2019/0087253 A1* | 3/2019 | Li | G06F 11/076 |
| 2019/0089577 A1* | 3/2019 | Misra | G06F 11/3447 |
| 2019/0129829 A1* | 5/2019 | Chen | G06N 20/20 |
| 2019/0146967 A1* | 5/2019 | Beedgen | G06F 16/258 707/703 |
| 2019/0163594 A1* | 5/2019 | Hayden | G06F 11/2257 |
| 2019/0205129 A1* | 7/2019 | Tameshige | G06F 9/542 |
| 2019/0258535 A1* | 8/2019 | Morisse | G06F 11/079 |
| 2019/0266070 A1* | 8/2019 | Bhandarkar | G06F 11/3644 |
| 2019/0278645 A1* | 9/2019 | Hsu | G06F 11/079 |
| 2019/0324831 A1* | 10/2019 | Gu | G06F 11/0793 |
| 2020/0073981 A1* | 3/2020 | Pilkington | G06F 16/2272 |
| 2020/0117587 A1* | 4/2020 | Salim | G06F 11/3476 |
| 2020/0201699 A1* | 6/2020 | Yu | G06F 11/32 |

OTHER PUBLICATIONS

Xiaochun Li et al.; "Integrating Research Root Cause Analysis Tools into a Commercial IT Service Manager"; B.Sc., University of Victoria, 2008—A Thesis Submitted in Partial Fulfillment of the Requirements for the Degree of Master of Science Department of Computer Science.*

Jain, et al., "Application Filed in U.S. Appl. No. 15/706,010", filed Sep. 15, 2017, 63 Pages.

Swati, et al., "Effective Task Assignment on Multi-Skill Worker Using Crowdsourcing", In International Journal of computer Science Trends and Technology, vol. 4, Issue 5, Sep. 2016, pp. 106-109.

Bagewadi, et al."Application Filed in Indian Patent Application No. 49/2017" Filed Date Aug. 12, 2017, 23 Pages.

"International Search Report and Written Opinion Issued in PCT Application No. PCT/US20/031255", dated Aug. 27, 2020, 12 pages.

* cited by examiner

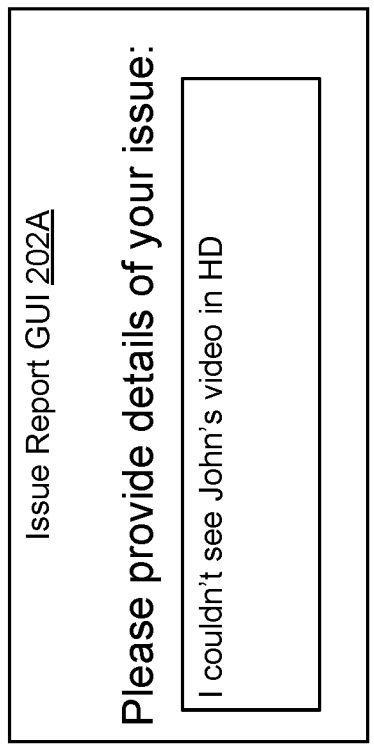
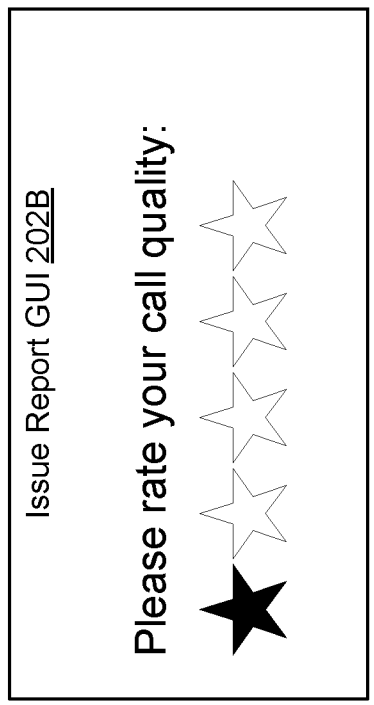
FIG. 2

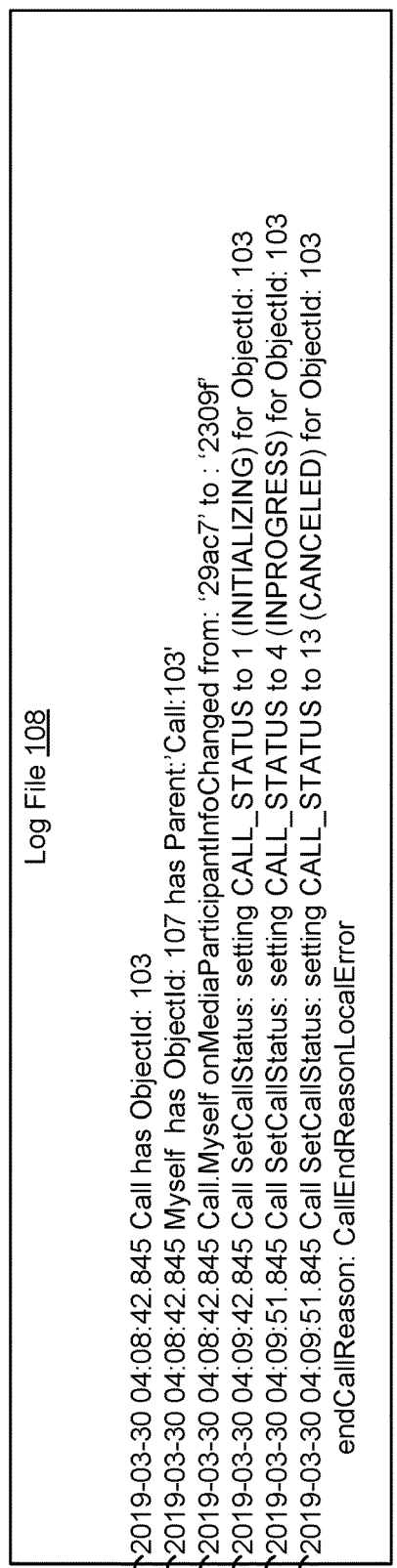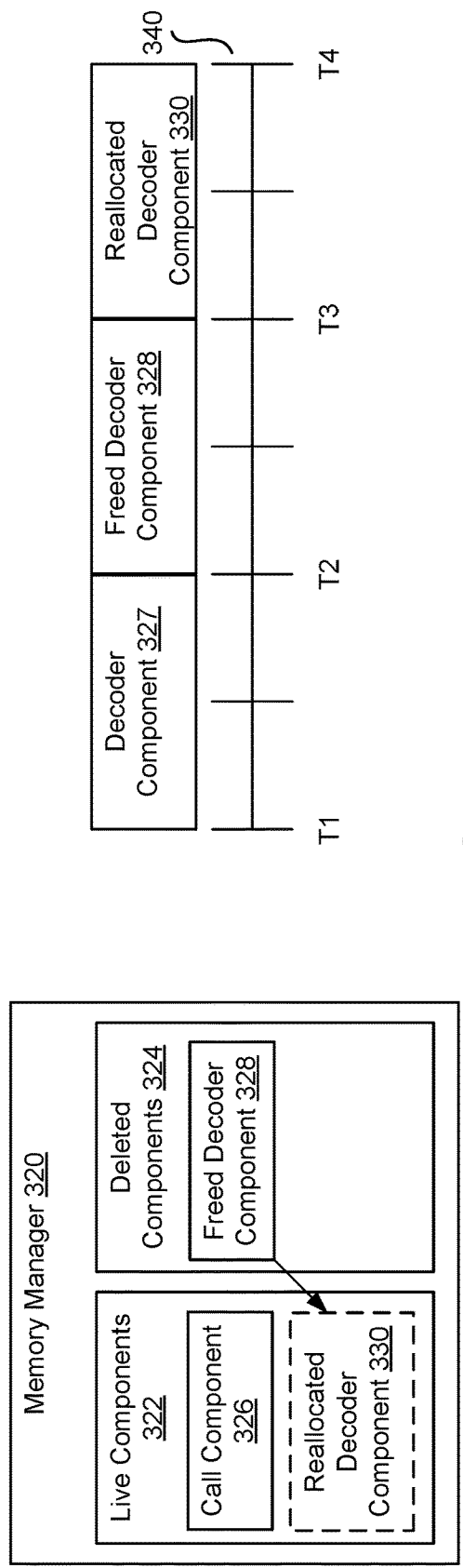
FIG. 3

Rule 120

```
public override void Validate() {
    Call.CallMember?.RemoteVideo?.ForEach((localVid) => {
        if (localVid.GetPropertyWithValue(STATE, "SourceError", out propertyContainer)) {
            CreateFailure(localVid, propertyContainer.Timestamp);
        }
    }
} private void CreateFailure(LocalVideo localVid, string timestamp) {
    CreateCallFailure(new CallFailure {
        failureCode = CallingFailureBuckets.VideoSourceError,
        issuePath = Paths.VideoPlatform, //"SCC\RTM\VIDEOPLATFORM
        objectId = localVid.Id,
        comment = $"LocalVideo encountered SourceError {localVid.GetLastPropertyValue()}"
    }
} public override void FindRootCause() {
    Call.CallMember?.RemoteVideo?.ForEach((localVid) => {
        if (localVid.GetPropertyWithValue(STATE, "NetworkError", out propertyContainer)) {
            ResolveIssue(localVid, propertyContainer.Timestamp);
        }
    }
}
```

OBJECT MODEL BASED ISSUE TRIAGE

BACKGROUND

Programming issues, also known in industry as bugs, are a common concern for software developers, and a common annoyance for software users. Programming issues (hereinafter "issues") include, for example, malfunctions, crashes, inoperable features, poor performance, unhandled error conditions, and other unexpected or undesired program behavior. Issues may be caused by the program itself, or by a piece of software or hardware used by the program, such as an operating system, processor, memory, network connection, remote service, database, peer user's software, peer user's device, third party library, etc.

Users often submit reports describing these issues. For example, in a video conference application, users may report that "I cannot join a meeting", "I tried to call this person, but the call failed", or "I can't see this person's video or screen share." Reports such as these may be submitted with log files, telemetry data, crash dumps, and other types of diagnostic data.

In order to efficiently address the issues described by the reports described above, the reports need to be assigned to teams in charge of the development or maintenance of the relevant software component. For example, remotely viewing a communication session participant's video stream in high definition is a single high-level function that is commonly implemented using many different software components, such as a networking component, a decoder component, a video rendering component, etc. As such, a report describing a problem with viewing the video stream may refer to the high-level functionality without specifying the component that contains the root cause of the issue. As a result, routing issue reports to the appropriate team for remediation can be time-consuming and can waste computing resources.

In order to identify the source of an issue, an engineer must typically analyze an issue report, scan through associated log files, and attempt to infer the cause of the issue. Often, the first engineer to investigate the issue will find that the root cause is not in one of the components she is familiar with, and she will forward the issue report on to another team for further investigation. An issue report may pass from team to team in this way three, four, or more times before the report is assigned to the appropriate team. Issue reports may even be passed back and forth between the same two teams multiple times before the appropriate team is identified.

This method of assigning responsibility for investigating an issue delays issue resolution and wastes human and computing resources. Furthermore, when log data submitted with an issue report is only available for a limited amount of time, such as data subject to the European Union's General Data Protection Regulation (GDPR), delays caused by issue triage may cause the log data to become unavailable, effectively eliminating any chance that the issue will be fixed.

Once an issue has been assigned to an appropriate team for investigation, root-cause diagnosis and resolution are still considerable challenges. This is particularly true for modern complex software that communicates with one or more network nodes, utilizes multimedia technologies, processes information asynchronously or in parallel, etc. Often these software products emit trace statements into log files for use in post-mortem debugging. However, the volume of these traces often obscures the root cause as much as they elucidate it. Navigating through a high volume of traces to investigate an issue also consumes large amounts of computing resources.

It is with respect to these and other considerations that the disclosure made herein is presented.

SUMMARY

The technologies described herein provide improved computer-implemented techniques for issue triage, diagnosis, root cause analysis, and resolution. In some configurations, a user-generated issue report (also referred to herein as a 'report') associated with a software application is assigned to an appropriate entity for investigation. In some configurations, the report is assigned by applying routing rules (also referred to herein as 'rules') to an object model until one or more of a rule's criteria is satisfied. The report may then be assigned to an entity associated with the satisfied rule.

In some configurations, the object model includes objects derived from entries in a log file. Each object may be derived from one or more entries emitted by a single instance of a component (also referred to herein as a 'component instance' or an 'instance') of the software application. An object may be related to another object, e.g. as part of a parent-child relationship. Taken together, objects and relationships between them establish an object hierarchy within the object model.

A rule may include one or more criteria applicable to the object model. If one or more of the criteria is satisfied, the rule may perform a prescribed task, such as assigning a report to an entity, updating the issue report to include a potential root cause of the issue, automatically resolving the issue report, or recommending to a user a process for remediation of the issue, e.g. applying a patch known to fix the issue. For example, the rule may have a criterion that determines a network connection failed. In response, the rule's prescribed task may resolve the issue report by indicating to the submitting user that the failed network connection was the root cause of the issue.

In some configurations, to construct an object model, entries in a log file may be parsed sequentially from beginning to end. Each entry may have been emitted by a particular instance of a component of the software application. Each entry may include the name of the component, an object identifier associated with the particular instance of the component that emitted the log entry (ObjectID), and a timestamp that indicates when the log entry was emitted. The ObjectID and timestamp may be used to uniquely identify the particular instance of the component that emitted the entry.

An object may be created for an instance of a component when the first log entry containing the ObjectID of the instance is encountered. Other entries are used to define a property of an object, e.g. a 'VideoStartTime' property that has a value of "03/12/19 at 12:34:08 PM" or a 'STATUS' property with a value of 'ACTIVE.' As such, an object indicates the properties of the corresponding instance of a component. One type of property is a relationship to another entry. As such, an entry may be used to define a relationship to a previously created object—e.g. a parent-child relationship—by reference to a previously encountered ObjectID. Data representing these objects and their properties, including the relationships between the objects, comprise the object model.

Component based development allows different portions of the software application to be developed by different entities. During execution, components may be instantiated one or more times, such that during a single execution of the software application, multiple instances of a component may be employed. By associating each object with a particular instance of a component, rules are not limited to analyzing components as a whole or the application as a whole. Instead, rules can analyze instances of components in isolation. This prevents false positives that could occur if an object contained properties from multiple components or multiple instances of the same component. For example, a rule that determines whether it took a decoder component too long to start displaying a remote video stream may give a false positive if a STARTING state from one instance is compared to a RUNNING state of a different instance.

In another example, a criterion of a rule created by a decoder component team may identify an indication of an out of memory condition. If the criterion is satisfied, the root cause of the issue is predicted to be in the decoder component, and so the issue report may be assigned to the decoder component team. By creating objects associated with instances of components, out of memory conditions in other components will not cause the report to be forwarded to the decoder component team.

A rule engine may apply rules to the object model. For the sake of clarity, throughout this disclosure, applying a rule or satisfying a rule is understood to mean applying one or more of the rule's criteria or satisfying one or more of the rule's criteria. The rule engine may apply many rules from different teams to determine which team to assign the report to. In some configurations, the rule engine performs the prescribed task associated with the first rule to be satisfied. In other configurations, the rule engine applies all available rules, counts how many rules are satisfied for each team, and assigns the issue report to the team with the most satisfied rules.

In some configurations, the rule engine does not know the contents of the issue report, the context of the software application when the issue report was generated, or any other information with which to limit or prioritize which rules are applied. In this case, the rule engine applies all rules from all entities. In other configurations, the rule engine applies a subset of rules and/or rules from a subset of entities based on an analysis of the issue report, the context of the software application when the issue report was generated, or the like. For example, the rule engine may perform a keyword search on the issue report to narrow the entities from which rules are selected. Similarly, the rule engine may receive an indication of what feature the software application was executing when the user created the issue report, and select rules from entities associated with that feature.

In some configurations, instead of being user generated, issue reports may be generated by applying rules to an object model derived from telemetry data. Telemetry data is data routinely collected from the software application, i.e. data that is collected without initiation by or interaction with the user. For example, a rules engine may apply rules to an object model derived from telemetry data that was collected as part of a customer experience improvement program, and that was not submitted in conjunction with a user-generated issue report. This configuration increases the number of issues identified and resolved in the software application by not requiring that issue reports be user-initiated.

While software applications are often discussed throughout this specification, this is for brevity and clarity. The claimed configurations apply equally to any other type of system capable of executing a program, including hardware, firmware, software, or a combination thereof. For example, a processor may include multiple instances of a processing core, an arithmetic logic unit, a register, or other component.

The technologies disclosed herein can provide a number of technical benefits over existing systems, including faster issue resolution, which improves software performance and reliability. Furthermore, identifying a root cause of an issue, or identifying the team to which an issue report is to be assigned, is a technological problem, and the disclosed techniques of parsing a log file, generating an object model, and applying rules to identify the root cause or route issue reports to the appropriate entity provides a technical solution to the technological problem. Technical benefits other than those specifically identified herein can be realized through implementations of the disclosed technologies.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIG. 2 illustrates a graphical user interface (GUI) for generating an issue report, according to one embodiment disclosed herein.

FIG. 3 illustrates the structure of an illustrative log file that includes log entries emitted by a computer application.

FIG. 5 illustrates a one or more criteria that may be applied to an object model to determine if a rule has been satisfied, and if so, to whom the issue report should be assigned for investigation.

DETAILED DESCRIPTION

Figure 1A:
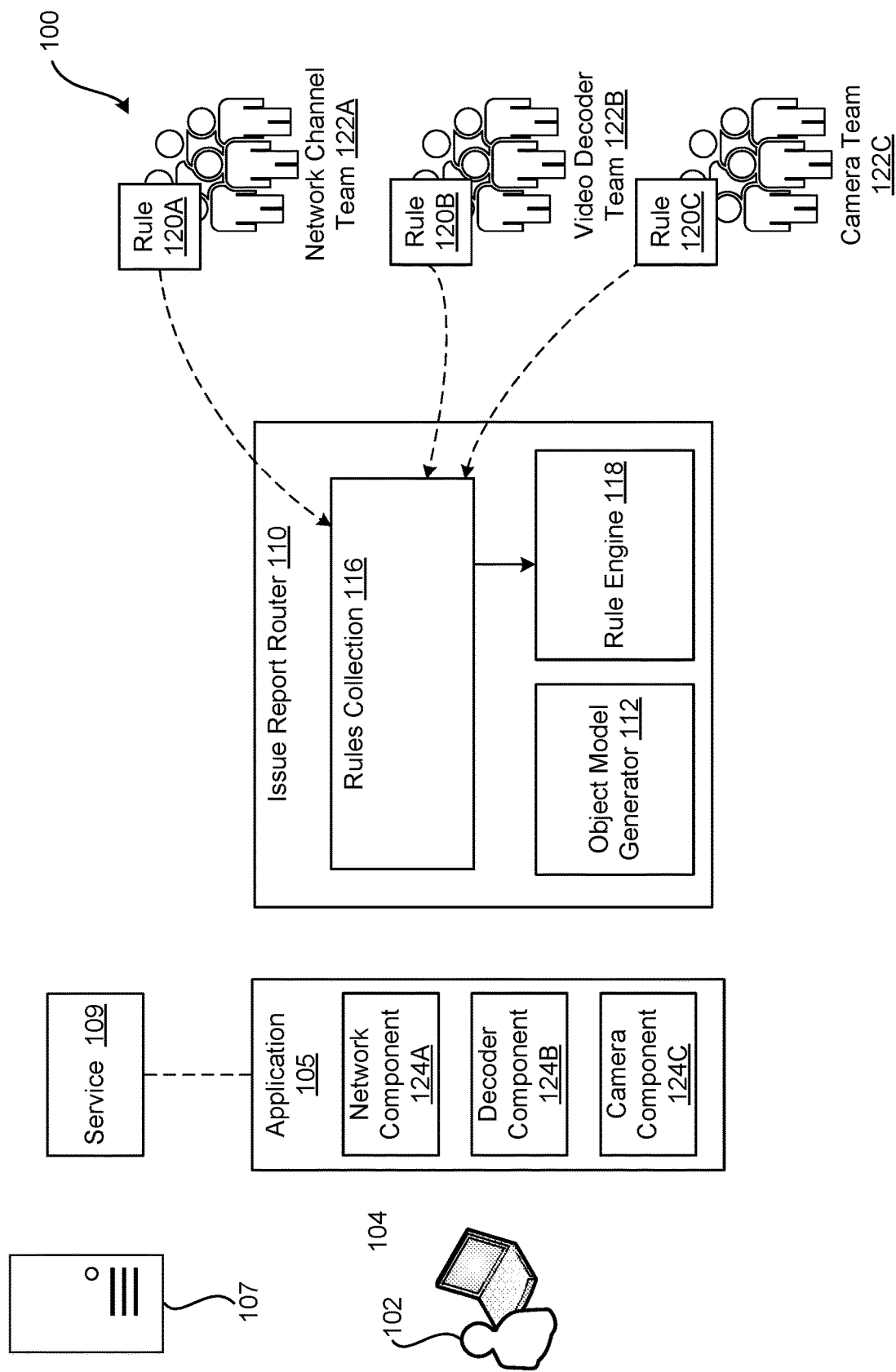
FIGS. 1A-1D illustrate aspects of the configuration and operation of a system disclosed herein for assigning an issue report by applying rules to an object model.

The following detailed description is directed to technologies for identifying a root cause of an issue report and/or routing issue reports to an appropriate team for investigation and remediation. As discussed briefly above, implementations of the technologies disclosed herein enable root causes of issues to be identified sooner and for issues to be remediated faster. By improving the feedback cycle of issue triage, diagnosis, and remediation, the disclosed technologies can improve the way computers operate by reducing the amount of time required to address an issue, thereby conserving computing resources. The disclosed technologies can also improve software quality by enabling engineers to diagnose and remediate issues that would otherwise go unresolved. Other technical benefits not specifically mentioned herein can also be realized through implementations of the disclosed subject matter.

While the subject matter described herein is presented in the general context of a computer software application that facilitates communication sessions, those skilled in the art will recognize that other implementations can be performed in combination with other types of computer applications, hardware based applications, or any other type of executable system. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), mini-computers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for object model based issue triage will be described.

FIG. 1A illustrates aspects of the configuration and operation of a computing system 100 for assigning an issue report to an appropriate team for investigation by applying rules to an object model. In particular, FIG. 1A illustrates rules generated by teams that contribute components to a computer application.

As shown in FIG. 1A, the illustrative system 100 includes a computing device 104 executing a software application 105 and is operated by a user 102. Software application 105 is referred to as such throughout for brevity and clarity, but software application 105 can be any executable system, including hardware, firmware, field programmable gate array (FPGA), or the like, or a combination thereof, and is referred to herein interchangeably as "computer application," "software application," or just "application"). Software application 105 may consume one or more services 109 executing on a server computing device 107 that provide functionality to software application 105. Software application 105 is associated with issue report router 110, which may operate on another server or other remote computing device. Issue report router 110 may also operate locally on computing device 104.

Issue report router 110 may include object model generator 112, rules collection 116, and rule engine 118. Rules collection 116 is a collection of rules 120 supplied by (or on behalf of) teams 122. While teams are discussed in some examples, any entity to which an issue report may be assigned is similarly contemplated and within the scope of all examples disclosed herein. For example, an issue report may be assigned to any suitable entity. An entity can include, but is not limited to, an individual, corporation, consortium, team, or the like. A consortium can include specialized groups such as a consortium in charge of open source projects. A team can include a number of individuals working on subject-focused projects and communicating through a common identity.

Teams 122 of developers are associated with—e.g. the creator of, responsible for, etc.—particular components 124 of the software application 105. As illustrated, network channel team 122A is associated with (e.g. has created or adopted) rules 120A, and is responsible for (e.g. created or maintains) network component 124A. Video decoder team 122B is associated with rules 120B and is responsible for decoder component 124B, while camera team 122C is associated with rules 120C and is responsible for camera component 124C.

Remotely viewing a communication session participant's video stream in high definition is a single high level function that is implemented using many different components. The inability to view a video stream in high definition may be due to a problem with network component 124A, decoder component 124B, camera component 124C, a component or service used by but not created or maintained by the entities that create software application 105, other un-named components, or a combination thereof. As such, it is not obvious which of teams 122A, 122B, or 122C an issue report describing issues with high definition video streams should be assigned.

Figure 1B:
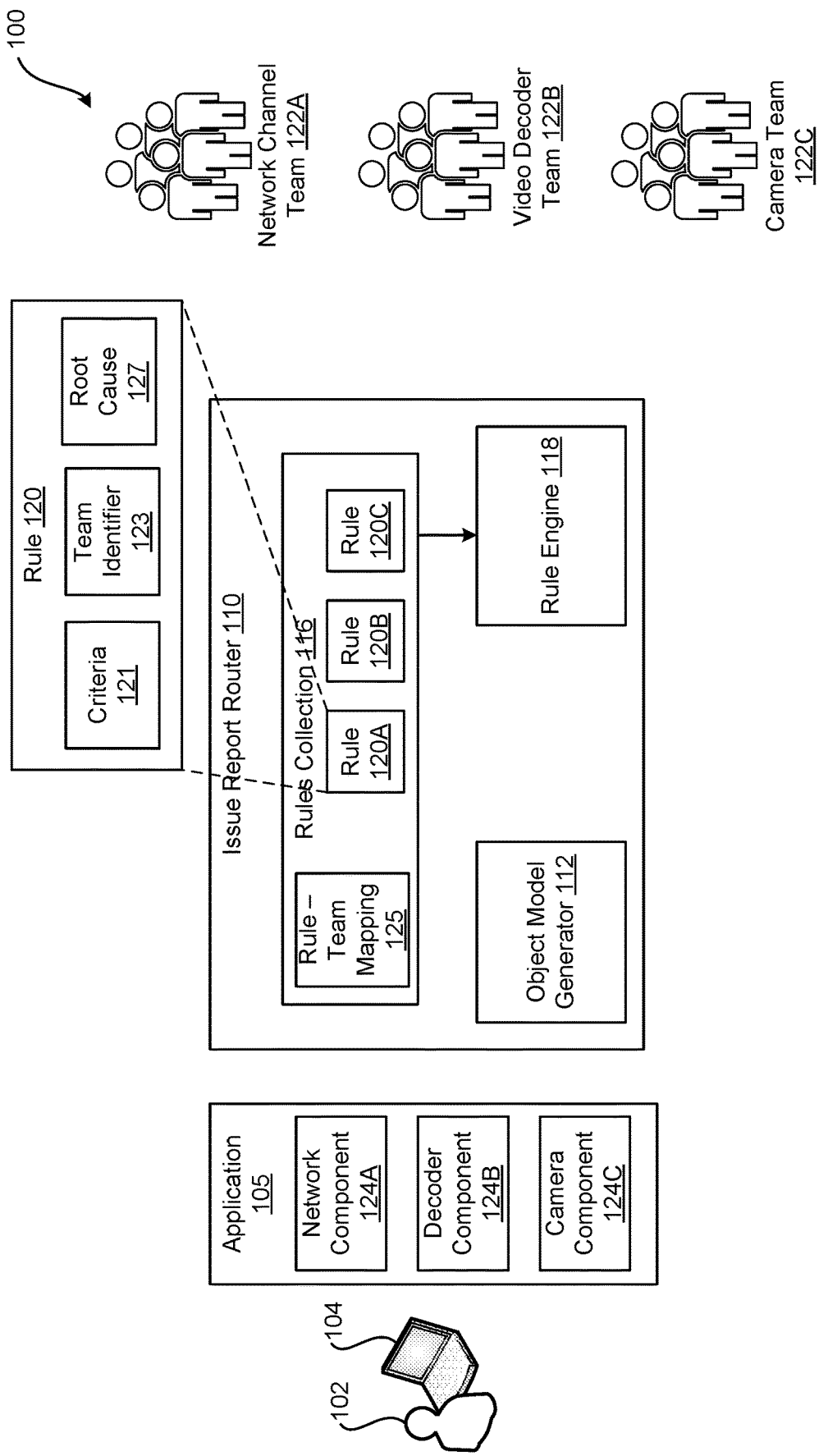

As illustrated in FIG. 1B, the rules 120A, 120B, and 120C have been submitted by teams 122A, 122B, and 122C, respectively, to rules collection 116. Rules collection 116 may maintain a mapping 125 between rules and teams. In another configuration, a rule includes a team identifier 123 that associates a rule with a particular team. In these configurations, a rule may be submitted by a team or on behalf of a team, and the team associated with a rule may be changed. Each rule may also include one or more criteria modules 121, further described below, that determines whether a rule is satisfied for an object model.

Figure 1C:
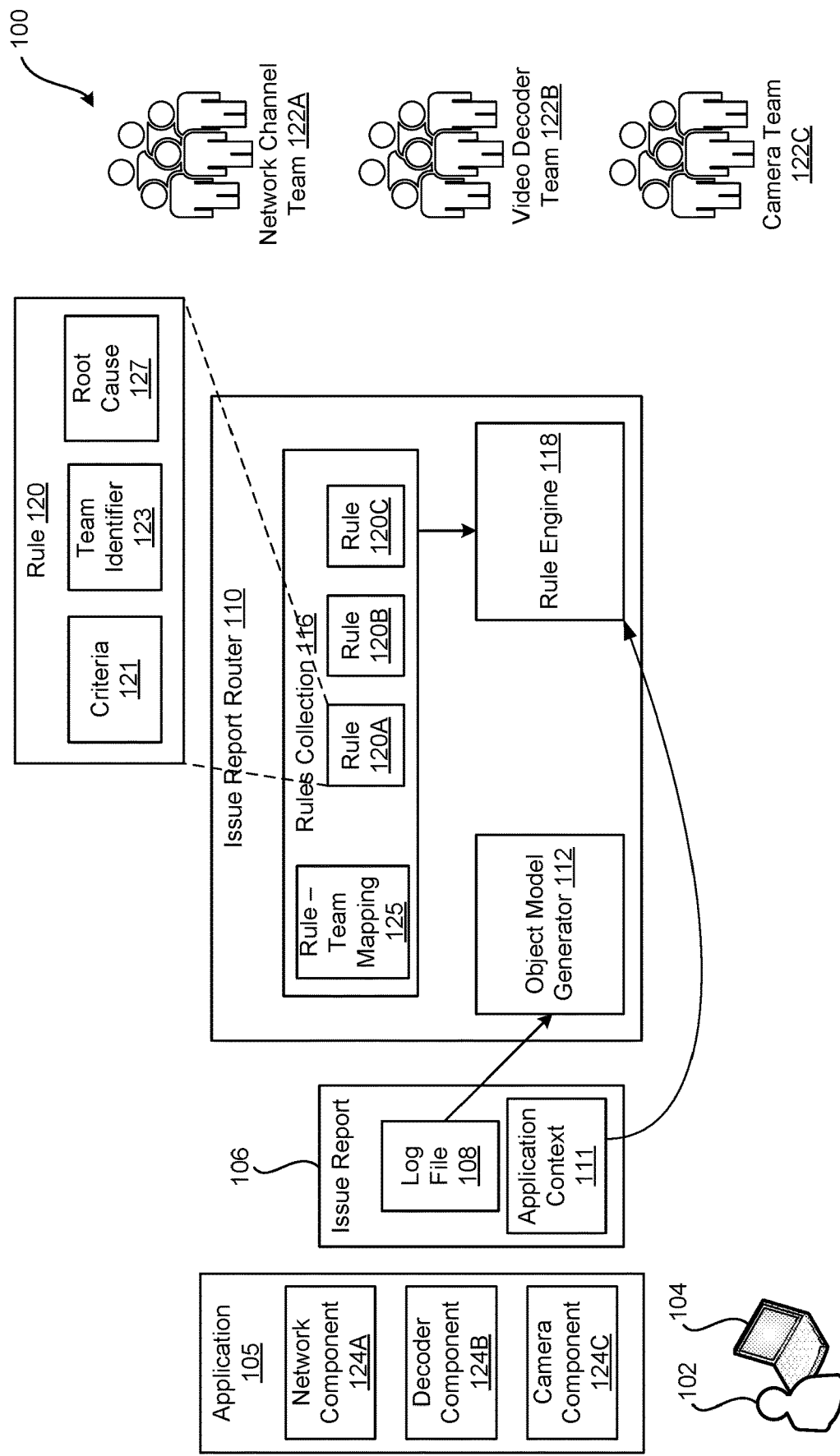

As illustrated in FIG. 1C, issue report 106 containing log file 108 is generated in response to user 102 interacting with software application 105. Issue report 106 may be referred to as a "report" throughout this disclosure. In some configurations, issue report 106 is generated through a customer feedback interface of software application 105. User 102 may initiate the customer feedback interface at any time and submit any feedback. Issue report 106 may describe an issue with software application 105, such as poor call quality, malfunctioning features, or the like. In other configurations, issue report 106 may describe an issue caused by a service 109 consumed by software application 105, by a network connectivity issue, or by a failure experienced by a peer computing device. For example, an application may not be able to retrieve a list of contacts from a directory server, prompting a user to submit an issue report stating, "I can't see my contacts". In some configurations, service 109 is a web service, a remote service, a database lookup, a directory service, a search service, or any other functionality executed by a server device 107. Software application 105 may consume the service by invoking the service 109 and utilizing a result returned by the service 109.

In some configurations, issue report 106 may include application context 111. Application context 111 may include any information usable by rule engine 118 to include, exclude, or prioritize rules 120 when routing the issue report. For example, rule engine 118 may use application context 111 to determine the order in which rules 120 will be applied.

For example, application context 111 may include one or more features of software application 105 that were in use, or had been used within a defined period of time, when issue report 106 was generated. A feature may be a piece of functionality implemented by application 105, such as spell check, print preview, render video stream, etc. A feature may also be implemented by service 109 or other remote computing device, such as a meeting participant's computing device. In some configurations, the list of recently used features may be extracted from log file 108, e.g. based on entries emitted within the defined period of time. Rule engine 118 may select or prioritize rules 120 from teams 122 associated with the listed features. For example, rule engine 118 may maintain a list of components 124 associated with each feature of software application 105, such that rule engine 118 can exclude or de-prioritize rules associated with components 124 that are not associated with the listed features.

Additionally, or alternatively, issue reports may be solicited at specific junctures in the software application, such as at the conclusion of a video call, the end of a level of a video game, or the submission of a tax return. The solicitation may be open-ended (e.g. "how was your call experience) or specific (did you experience reverb in the call's audio)? In these scenarios, the solicitation and/or the specific juncture are other examples of application context 111 usable by rule engine 118 to exclude or prioritize rules 120. For example, a solicitation about call quality of a video call may be leveraged by rule engine 118 to only apply rules associated with the call, e.g. to include rules associated with a network component or a decoder component. Additionally, or alternatively, rule engine 118 may exclude rules associated with components unrelated to call quality, such as a component for displaying an avatar of user 102.

In other configurations, issue report 106 is generated in response to an adverse event in software application 105, such as a crash, hang, unhandled exception, debug assert, poor performance, or the like. Issue reports generated in response to adverse events may be submitted unmodified or augmented with user supplied comments.

In another configuration, issue reports are generated independent of user action by applying rules to object models derived from telemetry data. For example, telemetry data may be one or more log files collected routinely as part of a customer experience improvement program. Issue reports generated in this way may be assigned to teams using the same techniques as issue reports that are user initiated or in response to an adverse event.

In some configurations, issue reports contain user-generated descriptions of the issue. User-generated descriptions may include text, screenshots, tags, data that was in use by application 105 when the issue occurred, etc. Issue reports may also include ratings, answers to multiple choice questions, form responses, and the like. In some configurations, user-generated descriptions of the issue may not be considered when applying rules to an object model. Instead, the creation of the issue report signifies that something is wrong, and that rules 120 should be applied to an object model 114 derived from the log file 108 to determine what team 122 to assign the issue report 106 to.

Figure 1D:
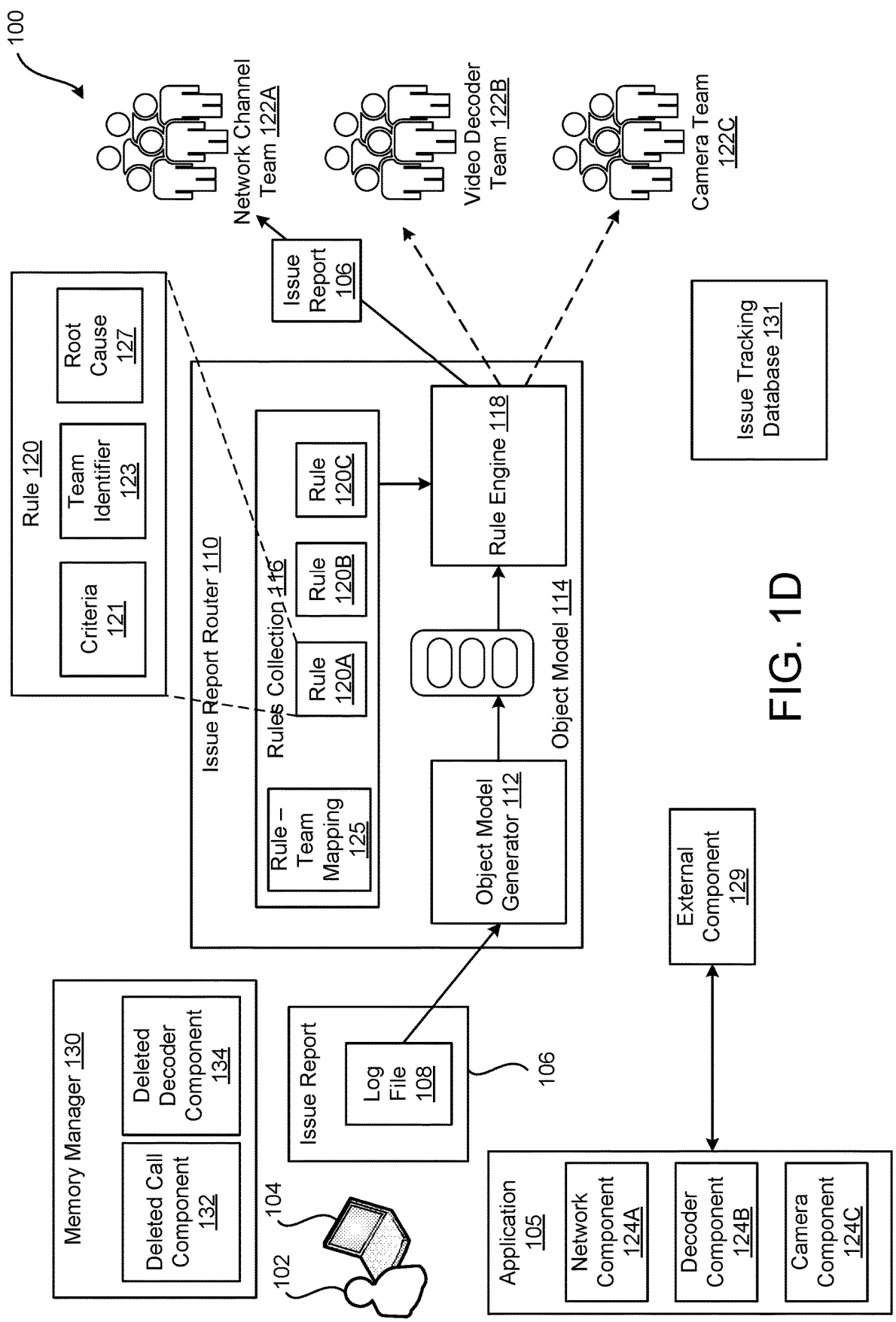

As illustrated in FIG. 1D, issue report router 110 processes issue report log file 108 into an object model 114 and applies rules 120 to determine which team 122 should receive issue report 106. Specifically, object model generator 112 receives issue report 106 and the associated log file 108. Object model generator 112 parses log entries contained in log file 108 to extract a hierarchy of objects. In some configurations, objects in the hierarchy of objects correspond to instances of particular components. For example, an object may represent an instance of a network component 124A, a decoder component 124B, or a camera component 124C used to display a remote video stream.

Rule engine 118 may then apply rules 120A, 120B, 120C, etc., from rules collection 116 to object model 114. Each rule 120 includes criteria module 121 and team identifier 123. When determining if a rule is satisfied, criteria module 121 is applied to object model 114, and if one or more of the criteria is met, rule engine 118 uses team identifier 123 to forward issue 106 to the appropriate team 122.

Criteria module 121 includes any manner of test that is run against object model 114 to determine if the rule 120 is satisfied. Criteria module 121 may search objects associated with a specific type of component (e.g. objects associated with a networking component) for properties with particular values (e.g. connection timeout values greater than 5 seconds). Additionally, or alternatively, criteria module 121 may identify patterns, trends, state changes, etc. For example, as an object's properties change over time, criteria module 121 may determine how much time it took a video component to transition from a 'STARTING' state to a 'RUNNING' state. Criteria module 121 may also determine if objects have an expected relationship to another object, such as whether an object associated with a first component type has a parent object associated with a second component type, as expected.

In one configuration, criteria module 121 may be in the form of a function with access to object model 114. Such a function may execute arbitrary code, allowing great flexibility in how it determines if rule 120 is satisfied. Object model 114 may be exposed to criteria module 121 as a hierarchy of objects, i.e. as a tree data structure comprised of a root, branches, and leaves. Criteria module 121 may navigate the hierarchy by iteratively selecting child objects along a branch until the desired object is reached. For example, in programming languages that use a '.' operator to access child objects, a root object, e.g. a Call object, may be referenced by name, and a child object, e.g. a Myself object, may be accessed by name using the '.' operator: "Call.Myself".

Additionally, or alternatively, the hierarchy of objects may be queried using an object query language such as Language Integrated Query (LINQ), Structured Query Language (SQL) or the like. Objects may be queried by associated component type, by whether a property of a given name exists, by whether any property has a particular value, whether a particular property has a particular value, or the like, or a combination thereof.

In one example scenario, criteria module 121 may determine if any properties of the objects associated with the video decoder component have a value of "SourceError". For example, if multiple participants of a communication session shared video, the video decoder component 122B may have been instantiated for each participant, and an object may be created in object model 114 for each instance of the video decoder component 122B (see FIG. 4 for an example of multiple objects associated with multiple instances of a component). Criteria module 121 may search for objects associated with the video decoder component in one location in the object hierarchy, or in multiple locations.

If one of the objects associated with an instance of the video decoder component has a property with the value of "SourceError", issue report 106 may be augmented with information extracted from object model 114. For example, the name of the property with the value of "SourceError", other properties (and/or their values) within the same object, or properties within other objects along the same branch of the identified object (e.g. properties of any ancestors or descendant objects in the hierarchical object model 114) may be used to augment issue report 106. One non-limiting example of a criteria module 121 is validate function 502 discussed below in conjunction with FIG. 5. In other configurations, criteria module 121 may include a search query (e.g. an XPath query), a regular expression, or the like.

If a rule is successfully applied to object model 114 (i.e. the rule is 'satisfied' or the rule 'matches'), issue report 106 is assigned to (e.g. forwarded to) the team defined by team identifier 123. In FIG. 1D, the criteria module 121 included in rule 120A indicates that issue report 106 should be assigned to network channel team 122A.

In some configurations, issue report 106 is assigned by updating a field in an issue tracking database (also known as a bug database). For example, an "assigned to" field in an issue tracking database may be updated to store the identity of the entity 122 the issue report 106 is assigned to. Identities may include email addresses, universal resource locators (URLs), or the like. Issue report 106 may also be assigned by forwarding, communicating, or otherwise transmitting the issue report 106 to entity 122, such as to a team alias, an email address, a consortium in charge of an open source product, a corporate entity, etc.

In some configurations, a root cause analysis 127 is applied to the object model 114. For example, if the issue occurs outside of software application 105, such as a network connectivity issue, an issue with a peer client's software or hardware, an issue with a hosted service consumed by the software application 105, or any other external component 129, root cause analysis 127 may determine that the software application invoked the external component successfully, but that the external component 129 did not respond or did not provide an appropriate response. This identifies the external component 129 as the root cause of the issue. In these circumstances, rule engine 118 may automatically resolve the issue report 106 as "issue not caused by the software application 105," saving the time and expense it would require for an engineer to identify the root cause of the issue and resolve the issue report 106. In some circumstances, instead of resolving the issue report 106 based on the identified root cause, rule engine 118 augments issue report 106 with the results of the root cause analysis 127, assisting the engineer that issue report 106 is assigned to.

FIG. 2 illustrates a graphical user interface (GUI) for generating an issue report. Issue report GUI 202A is an example of an open-ended prompt for user feedback, in that the prompt for feedback is not tied to a particular application juncture. Issue report GUI 202A also is an example of an issue report that includes free-form user entered text.

Issue report GUI 202B is an example of an issue report solicited from a particular juncture. Specifically, issue report GUI 202B is solicited at the completion of a call. Issue report GUI 202B is also an example of an issue report that solicits structured feedback. In this case, the feedback solicited is a star rating. In some configurations, an issue report may be filed only if the user-supplied star rating falls below a particular threshold. Other types of structured issue report GUI are similarly contemplated, including drop-down menus, check boxes, and other user interface controls.

FIG. 3 illustrates the structure of an illustrative log file 108 that includes log entries 302 generated by a software application 105 and emitted into the log file 108. In some configurations, log file 108 contains the output of trace statements included in components of the software application 105. Trace statements may include text emitted by software application 105 for debug purposes. Log entries may include a timestamp, a component name, and an ObjectID. In some configurations, a log entry is emitted by a specific instance of a component. At any given point in time, different instances of a component have different ObjectIDs. For example, an online meeting application may instantiate instances of a "MeetingParticipant" component for each participant in a meeting. By distinguishing which instance of the "MeetingParticipant" component emitted the log entry, properties and relationships of a particular instance of a component can be collected and analyzed as a whole object, not as scattered log entries. At the same time, the properties and relationships of the particular instance can be analyzed apart from properties and relationships of other instances of the same component and other components.

While log entries in a log file are discussed frequently throughout this disclosure, a log file is one example of an event stream that contains a number of entries. Other types of event streams are similarly contemplated as the basis of object model 114. Event streams may supply entries in real time, e.g. event streams may be streams of entries provided by software application 105 to issue report router 110 via a web service invocation or other remote procedure call.

Furthermore, log entries 302 may be aggregated from multiple different log files 108. For example, some components, or instances thereof, may output their own log file, in addition to or instead of emitting log entries in log file 108 associated with software application 105 as a whole. Furthermore, log files may be collected from multiple instances of software application 105 running on the same or different computing devices 104. For example, in a multi-party online meeting, each client may output one or more log files from the perspective of a different meeting participant using a different computing device. These log files may include information not available to a particular computing device 104, so that the log entries collected from multiple log files contain more information than would be available from any single log file.

Log entry 302A is emitted by the call component 326 and introduces this particular instance of the call component 326 as having ObjectID '103'. The call component 326 is one example of a software component that performs a subset of a computer application's functionality. In this example, software application 105 facilitates communications sessions, e.g. meetings, video calls, etc., and a call component manages calls, such as video calls, with other meeting participants. Components may be implemented as modules, libraries, dynamic link libraries (.dlls), shared objects, namespaces, classes, or other means of componentizing code. Log entry 302A also includes a timestamp "2019-03-30 04:08:42.845", which is a string representation of the date and time when the log entry was emitted.

ObjectIDs and timestamps may be used to distinguish multiple instances of a component in log file 108. For example, software application 105 may instantiate multiple instances of the call component 326. In some circumstances, each instance of the call component 326 has a different ObjectID, and so ObjectID alone uniquely identifies the different instances across the lifetime of software application 105.

However, in other configurations, an ObjectID may not be sufficient to distinguish all instances of a component across the lifetime of software application 105. Specifically, when ObjectIDs are generated by a memory manager 320 running on computing device 104, ObjectIDs may be re-used at different points in time. For example, memory manager 320 may separately track live components 322—e.g. call component 326—that have been allocated for and are in use by software application 105. At the same time, memory manager 320 may keep a list of 'freed' components 324 (also referred to as 'deleted' or 'garbage collected'). For example, freed decoder component 328 represents a decoder component that software application 105 has determined is no longer needed, and as such is available to have associated resources (e.g. system memory) reclaimed.

In response to a request from software application 105 to allocate another decoder component, memory manager 320 may re-use freed decoder component 328 by adding it to live components 322 as reallocated decoder component 330. In some configurations, reallocated decoder component 330 will have the same ObjectID as freed decoder component 328. This does not impact the runtime behavior of the application, as at any given time, all ObjectIDs across software application 105 are unique. However, re-used ObjectIDs create the possibility that properties and relationships emitted by different instances of a component become improperly merged into a single instance of an object by rules engine 118.

Specifically, if an instance of a component has an ObjectID of '103', and is alive from time T1 to time T2 (as indicated on timeline 340), and is 'freed' from time T2 to time T3, and if another instance of the same component is created by re-allocating the first instance from time T3 to time T4 (where there is no overlap between T1-T2 and T3-T4), then techniques that only used ObjectID to distinguish component instances could improperly combine properties from the T1-T2 instance and the T3-T4 instance into the same object.

In instances where an ObjectID is not unique across the lifetime of software application 105, a timestamp may be used to determine which instance of a component a log entry 302 is associated with. In some instances, component lifetimes are determined from log entries. For example, a log entry may indicate that a component was created at time T1, and another log entry may indicate that the component was freed at time T2.

Similarly, log entries may indicate that a different instance of the component, but which has the same ObjectID, was alive from time T3-T4. Other log entries that refer to the same ObjectID (e.g. log entries that define a property value, or a state change), may be associated with a particular instance of the component based on the shared ObjectID and timestamp. In some configurations, the other log entries are associated with the instance of the component that is closest in time—i.e. the instance of the component that was most recently instantiated. In some configurations, the other log entries are associated with the instance of the component that is closest in time looking backwards in time—log entries cannot be emitted by component instances that haven't been instantiated yet.

Log entry 302B introduces an instance of the Myself component having an ObjectID of '107'. At the same time, log entry 302B defines a parent-child relationship. Specifically, log entry 302B defines the call component that has ObjectID '103' to be the parent of the Myselfobject with ObjectID '107'.

Log entry 302C is an example of a log entry that defines a change in a property value. Specifically, log entry 302C states that the 'onMediaParticipantInfoChanged' property changed from '29ac7' to '2309f'. As such, after processing this log entry, object model generator 112 may update an object representing Myself to store the new value of 'onMediaParticpantInfoChanged'. Additionally, or alternatively, object model generator 112 may add a property to the object representing Myself indicating that the 'onMediaParticpantInfoChanged' property has changed from the old value to the new value. Additionally, or alternatively, object model generator 112 may maintain a list of values that the 'onMedia-ParticpantInfoChanged' property has had, at what times, and upon encountering log entry 302C, add another entry to the list.

Log entry 302D is an example of a log entry that sets a property. Specifically, log entry 302D sets the value of the CALL_STATUS property to 1 (INITIALIZING). This assignment is specific to the instance of the call component that has ObjectID '103', such that other instances of the call component (not shown) would not be affected by log entry 302D. Log entries 302E and 302F similarly set the CALL_STATUS property to 4 (INPROGRESS) and 13 (CANCELLED), respectively. Log entry 302F sets another property—'endCallReason'—to 'CallEndReasonLocalError'.

Figure 4:
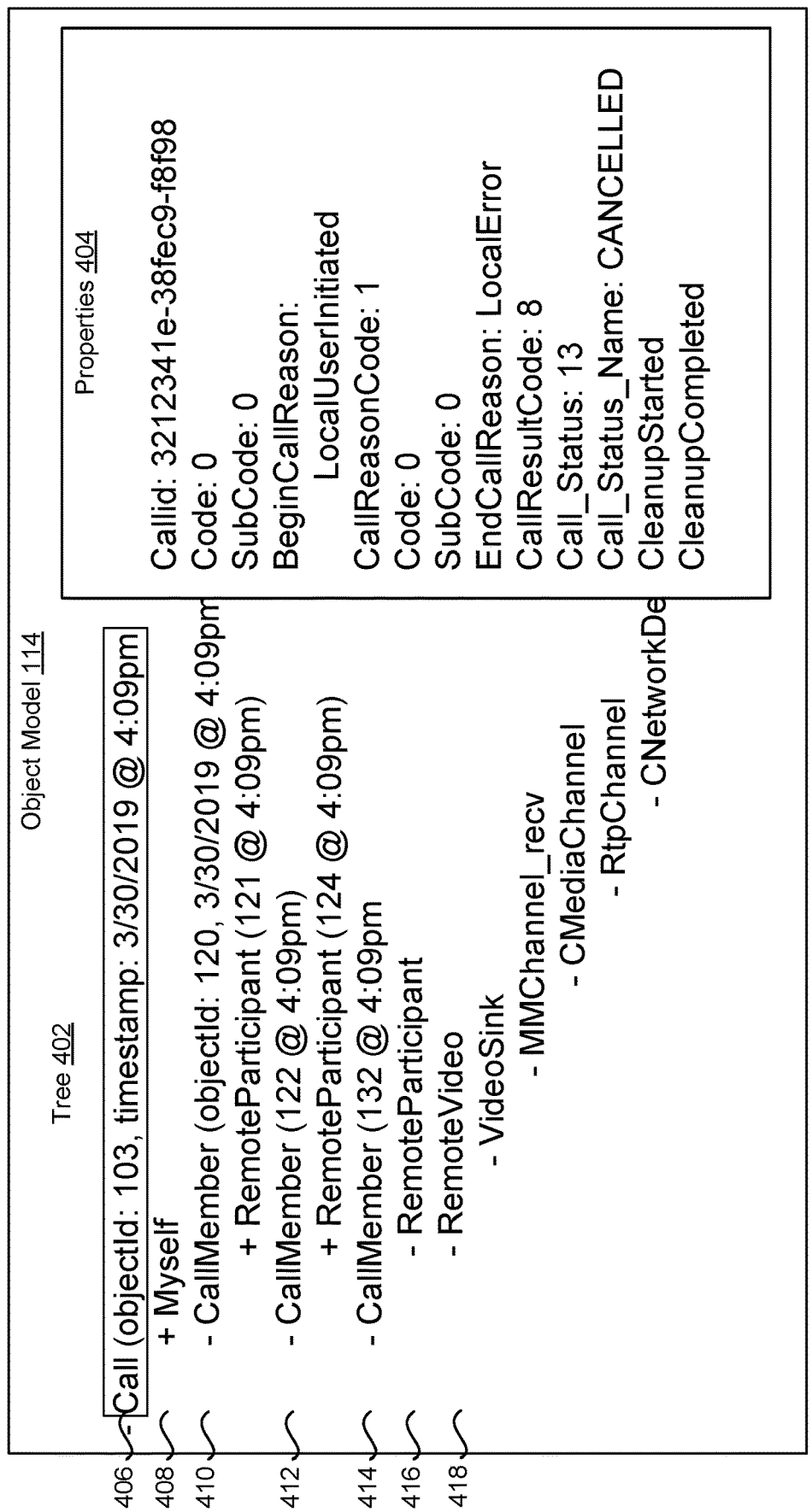
FIG. 4 illustrates aspects of an object model extracted from entries from one or more log files associated with an issue.

FIG. 4 illustrates aspects of an object model 114 extracted from entries 302 from one or more log files 108 associated with an issue 106. In some configurations, the one or more log files 108 are associated with the issue 106 in that the log file contains the contents logged by software application 105 up until the point that issue 106 was submitted by the user or otherwise identified. The object model itself may be stored in JavaScript Object Notation (JSON), eXtensible Markup Language (XML), comma delimited text, a relational database, or any other information storage format.

In some configurations, object model generator 112 generates object model 114. Object model generator 112 may parse a log entry by applying a series of patterns to the log entry until a match is found. Patterns may be in the form of regular expressions. In some configurations, object model generator 112 matches and processes each log entry 302 in turn before processing the next log entry 302. In another configuration, object model generator 112 matches all log entries and then extracts object model 114 from the matched entries.

Tree 402 illustrates a hierarchy of objects that make up the object model. Properties 404 depict the properties that have been associated with object 406. A user may select other objects in tree 402 to view their properties. In this example, Call object 406 is a root object in the object model. Call object 406 represents a video call between a number of participants: Myself 408, CallMember 410, CallMember 412, and CallMember 414. In some configurations, CallMember objects 410-414 are associated with different instances of the CallMember component.

Child objects may have lifetimes that begin and end within the lifetime of a parent object. In this example, Call object 406 encompasses the entire call, while CallMember objects 410, 412, and 414 were started and stopped (i.e. were initialized and destructed) during the lifetime of Call object 406. Similarly, CallMember object 414 has two child objects, RemoteParticipant object 416 and RemoteVideo object 418, that were initialized and destructed within the lifetime of CallMember object 414. The RemoteVideo object 418 is expanded to show a number of descendants along a branch, e.g. VideoSink, MMChannel_revc, CMediaChannel, RtpChannel, CNetworkDev, etc.

Each of these objects are derived from one or more log entries generated by their respective component instances. For example, this particular VideoSink object was created based on a log entry generated by a corresponding instance of the VideoSink component. Furthermore, the hierarchy of objects 406-418 may be derived from parent-child relationships defined in the log file. For example, a log entry generated by an instance of the CallMember component may contain an ObjectID of an instance of the Call component, which forms the basis of the parent-child relationship between Call object 406 and CallMember object 410.

In some configurations, parent-child relationships of objects are derived from parent-child relationships of components. For example, if component A depends on component B, e.g. if component A consumes functionality exposed by component B, objects representing properties of component A may be inferred to be parents of objects representing properties of component B. In another configuration, parent-child relationships of objects are derived from parent-child relationships of instances of components as indicated in log entries. In this configuration, an instance of component A may be a parent or a child of an instance of component B, independent of which component depends on the other.

The properties of Call object 406 have been aggregated from multiple log entries. For example, the properties 404 indicate that a call was initiated by a local user, and that the call ended with a local error, each of which was inferred from a different log entry.

FIG. 5 illustrates a criteria 121 of rule 120 that may be applied to object model 114. If criteria 121 is satisfied, rule 120 may determine which entity 122 to assign issue report 106 to for investigation. Rule 120 may have a hardcoded team identifier 123. For example, as depicted in FIG. 5, the CreateFailure function 506 assigns issue report 106 to the entity referenced by the "Paths.VideoPlatform" variable. "Paths.VideoPlatform" may contain a string value such as "SCC\RTM\VIDEOPLATFORM", which identifies the VideoPlatform team 122 in the issue tracking database 131. Additionally, or alternatively, rule 120 may select an identifier 123 of one of a number of teams 122 based on one or more properties or relationships found in object model 114. For example, rule 120 may have criteria 121 satisfied by a "CallMember" object, but assign the issue report to a team associated with a parent of the "CallMember" object. In another example, rule 120 may assign the issue report to a first team when a single object satisfies the criteria, while assigning the issue report to a second team when multiple objects satisfy the criteria.

In another configuration, rule 120 may apply root cause analysis 127 to object model 114. If root cause analysis 127 identifies a root cause, rule 120 may resolve issue report 106, e.g. by updating issue report 106 in issue tracking database 131 to include a description of the identified root cause. Additionally, or alternatively, rule 120 may resolve issue report 106 by communicating the resolution to the user that submitted the issue report.

In some configurations, a root cause analysis 127 may determine that the issue is caused by an external service, piece of hardware, or other dependency of application 105. For example, root cause analysis 127 may search for objects that indicate a network call was initiated but the response was slow or never received. This may indicate that a poor or missing network connection was the root cause of the reported issue and not software application 105. Root cause analysis 127 may also determine that an error occurred in an internal dependency, e.g. a third party library included in software application 105. For example, root cause analysis 127 may search for objects indicating a third party library was invoked but did not return, or threw an unhandled exception, and as such identifying the third party library as the root cause of the reported issue.

In these examples, issue report 106 may be resolved by indicating that software application 105 is not at fault for the reported issue. Issue report 106 may be resolved without informing team 122, thereby sparing team 122 from spending time and computing power on analyzing the issue report 106. In other configurations, even if an issue report 106 is resolved as not being caused by the software application 105, rule engine 118 may still assign the issue report 106 to a corresponding team 122 based on team identifier 123 for the purpose of confirming the resolution.

Root cause analysis 127 may also identify issues within software application 105. For example, an instance of component 124 of software application 105 may emit log entries indicating where, within the component 124, execution is occurring. An object corresponding to the instance of the component may aggregate these points of execution, and root cause analysis 127 may analyze them to determine that software application is in an infinite loop. In some configurations, root cause analysis may identify a condition that is part of the infinite loop, and which is unexpectedly never allowing the loop to exit. Root cause analysis 127 may identify this condition as the root cause of the issue.

Root cause analysis 127 may also identify one or more potential pieces of source code in which the root cause of the issue may be found. In some configurations, root cause analysis 127 is integrated with a source code control system, which can list source code changes on a per-component level. Root cause analysis 127 may determine which component a rule is associated with, and list a defined number of recently submitted changes to the component's source code as potential locations of the issue's root cause. For example, a rule may be associated with a decode component, and when the rule's criteria is satisfied, root cause analysis 127 may retrieve one or more recent source code changes made to the decoder component. These recent source code changes may be added to the issue report for analysis by an engineer.

In some configurations, one or more root cause analyses 127 are applied in addition to criteria 121, such that the results of the root causes analyses 127 may be attached to issue report 106 or otherwise communicated to engineers assigned to investigate issue report 106.

Rule 120 illustrates a Validate function 502, which operates on object model 402 to determine if one or more criteria is satisfied. Rule 120 also illustrates a CreateFailure function 506 that assigns an issue report to the appropriate team, and a FindRootCause function 508 that determines the root cause of the issue.

Line 504 of the Validate function, "Call.CallMember.RemoteVideo?.ForEach((localVid)=>" ", traverses object model 114 from a Call object 406 to a CallMember object 414, and then applies a condition to each RemoteVideo object 418 contained in CallMember object 414. In this example, the condition checks to see if the STATE property of the RemoteVideo object 418 has a value of "SourceError". If so, the CreateFailure function 506 is called to assign the issue report 106 that triggered the analysis.

The CreateFailure function 506 augments the issue report 106 with information extracted from the object model. Specifically, CreateFailure sets 'failureCode' to be 'VideoSourceError', indicating that the problem was in the video (as opposed to network, camera, etc.). 'issuePath' is set to 'Paths.VideoPlatform', which assigns the issue to the Video Platform team. The ObjectId property is set to the Id of the object that satisfied the one or more criteria, and may be used by an engineer investigating the issue to load and view the object. For example, the engineer may load the object model 114 into a user interface as depicted in FIG. 4, and use the ObjectId property to navigate to the object that satisfied the one or more criteria. The comment property adds extra information that may be useful to the engineer that investigates the issue.

The FindRootCause function 508 is an example of root cause analysis 127. FindRootCause function 508 searches RemoteVideo objects in the object model, e.g. by finding RemoteVideo objects that have a STATE property with a value of "NetworkError". As illustrated, FindRootCause function 108 navigates object model 114 from a root "Call" object to a "CallMember" object, and again navigates from the "CallMember" object to the "RemoteVideo" objects before searching for objects with a STATE property having the value of network error.

Figure 6:
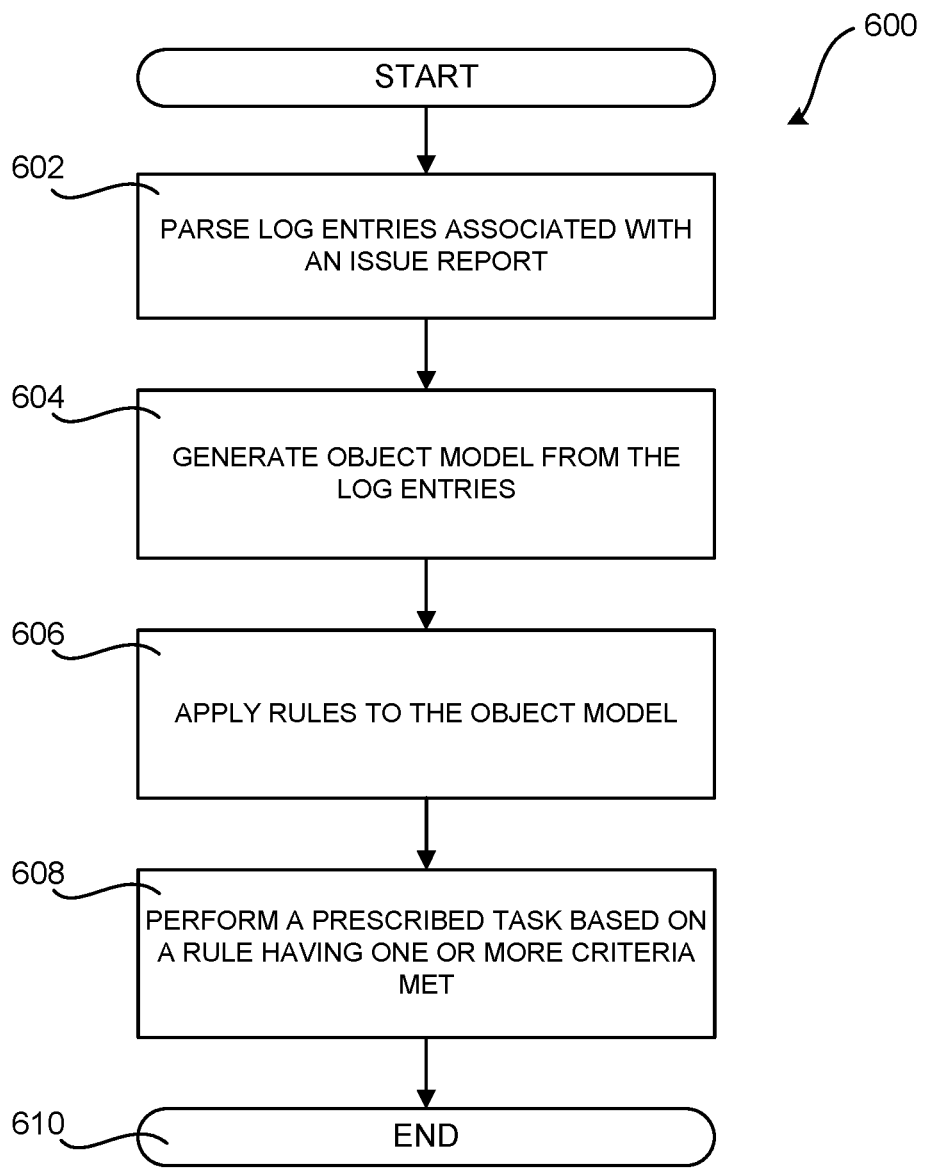
FIG. 6 is a flow diagram illustrating aspects of a routine for object model-based issue triage.

FIG. 6 is a flow diagram illustrating aspects of a routine 600 for object model-based issue triage and root cause analysis, as described above with reference to FIGS. 1-5. It should be appreciated that the logical operations described herein with regard to FIG. 6, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 600 begins at operation 602, where log entries 302 contained in a log file 108 associated with an issue report 106 are parsed. From operation 602, the routine 600 proceeds to operation 604, where an object model 114 is generated from log entries 302 extracted from the log file 108.

In some configurations, objects are arranged in the object model 114 based on parent-child relationships extracted from log entries 302. In some configurations, properties are added to objects in the object model 114 from log entries that contain a component name, an ObjectID, the property name and property value, and optionally a timestamp. By extracting a flat log file into a hierarchical object model 114, and by combining properties from multiple log file entries into a single logical object, log file data may be more conveniently analyzed by rules 120 to determine which team to assign the issue report, how to identify a root cause of the issue, or how to resolve the issue report. Furthermore, information can be extracted from log files and presented to a user 102 without being obscured by unrelated log entries, as depicted in FIG. 4.

From operation 604, the routine 600 proceeds to operation 606, where rules 120 are applied to the object model 114. In some configurations, one or more criteria associated with rules 120 are applied to determine which, if any, rules 120 are satisfied by the object model 114. In some configurations, criteria are implemented by a function 502 that has access to some or all of the object model 114, and which is capable of executing arbitrary code to determine if the rule 120 is satisfied. Criteria may also be implemented by pattern matching, e.g. regular expressions, by comparing a list of expected properties and values to the actual properties and values contained in a particular object, or the like.

For example, a rule titled "Remote video slow to running" may determine if the software application 105 was too slow transitioning from a STARTING state to a RUNNING state for video or screen sharing. In this example, the software application 105 may have received a button press indicating the user wants to view a meeting participant's video. In response, an instance of a RemoteVideo component may emit a log entry that indicates the RemoteVideo component has a state of STARTING. Operation 604 may create an object corresponding to the instance of the RemoteVideo component, and create a property in that object indicating the state variable was set to STARTING. The property may indicate the time the state variable was set to STARTING based on the timestamp in the log entry.

Once the video begins, the instance of the RemoteVideo component may emit another log entry 302 indicating when the state was set to RUNNING. Operation 604 may create a property in the same corresponding object to represent this state change. The "remote video slow to running" rule may then measure the time from button press to video start by based on the values of the properties in the object that corresponds to the instance of the RemoteVideo component. If the amount of time elapsed is greater than a defined threshold, e.g. more than 5 seconds, then it took too long to start the video. In response, an issue report may be created, or a user-generated issue report may be augmented with additional information.

In some configurations, a rule includes a root cause analysis 127 that analyzes the object model to determine what caused the issue. The root cause analysis 127 may be included in criteria module 121, or may be separate from it. Root cause analysis may detect uninitialized values, out of memory conditions caused by objects not being disposed of properly (e.g. 'freed' or 'garbage collected'), infinite loops and conditions that are unexpectedly not exiting the infinite loop, or third party libraries or external dependencies that are the root cause of the issue. In some configurations, the root cause analysis applies a lexical analysis of the issue report to determine if the identified root cause is related to the description of the issue.

From operation 606, the routine 600 proceeds to operation 608, where a prescribed task is performed based on a rule having one or more criteria met. In some configurations, a criteria is associated with assigning the issue report, in which case rule engine 118 assigns the issue report 106 to a particular team 122. In some configurations, each rule 120 has a specific team 122 associated with it, and rule engine 118 forwards the issue report 106 to that team 122. In other configurations, a rule 120 may dynamically assign the issue report 106 to a team 122 based on conditions in the object model 114. For example, a rule 120 may analyze information associated with multiple objects and forward an issue report to a first team when a first criteria is met, but forward the issue report to a second team when a second criteria is met.

Additionally, or alternatively, the prescribed task resolves the issue report 106 in response to a root cause analysis being satisfied. Rule engine 118 may resolve issue report 106 by communicating the resolution to the customer that generated it. Rule engine 118 may additionally notify team 122 associated with rule 120 that the issue report was receive, analyzed, and resolved. From operation 608 the routine proceeds to 610 where it ends.

Figure 7:
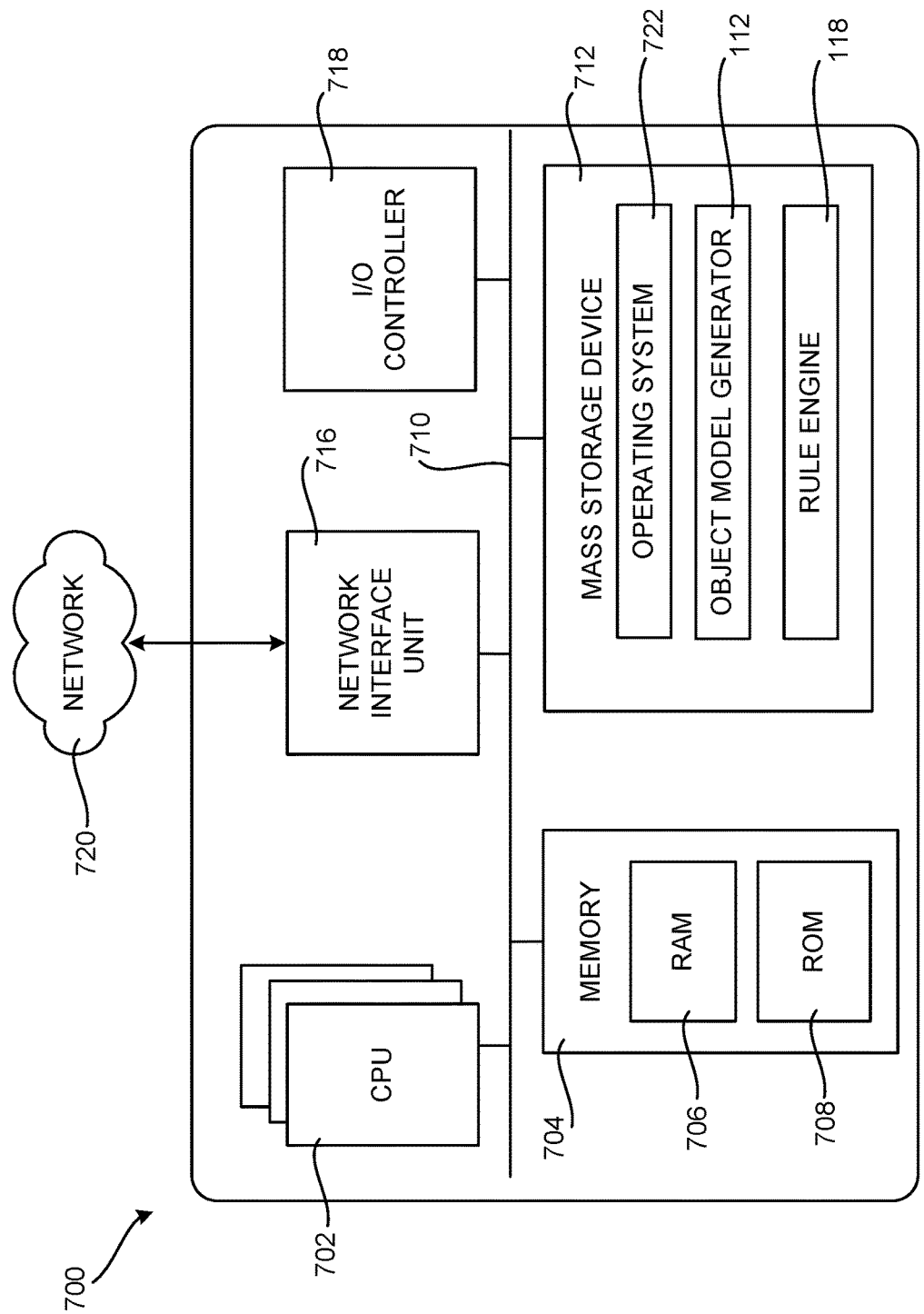
FIG. 7 is a computing system diagram showing aspects of an illustrative operating environment for the technologies disclosed herein.

FIG. 7 is a computer architecture diagram showing an illustrative computer hardware and software architecture for a computing device that can implement the various technologies presented herein. In particular, the architecture illustrated in FIG. 7 can be utilized to implement a server computer, mobile phone, an e-reader, a smartphone, a desktop computer, a tablet computer, a laptop computer, or another type of computing device.

The computer 700 illustrated in FIG. 7 includes a central processing unit 702 (CPU), a system memory 704, including a random-access memory 706 (RAM) and a read-only memory (ROM) 708, and a system bus 710 that couples the memory 704 to the CPU 702. A basic input/output system (BIOS[ or "firmware) containing the basic routines that help to transfer information between elements within the computer 700, such as during startup, can be stored in the ROM 708. The computer 700 further includes a mass storage device 712 for storing an operating system 722, application programs, and other types of programs, such as the object model generator 112 and the rule engine 118. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
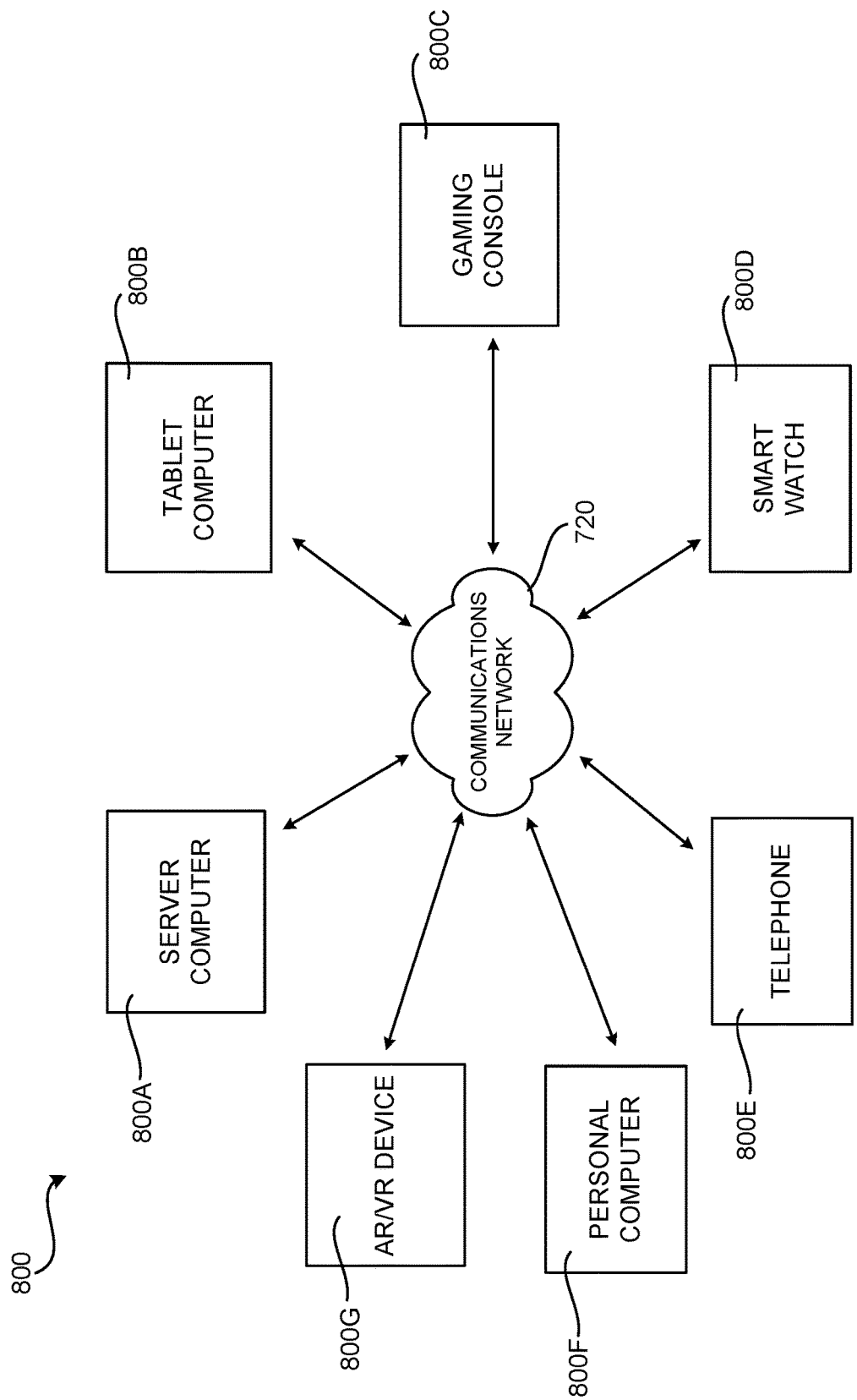
FIG. 8 is a computing architecture diagram showing aspects of the configuration and operation of a computing device that can implement aspects of the technologies disclosed herein.

FIG. 8 is a network diagram illustrating a distributed network computing environment 800 in which aspects of the disclosed technologies can be implemented, according to various embodiments presented herein. As shown in FIG. 8, one or more server computers 800A can be interconnected via a communications network 720 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an AR/VR device 800G.

In a network environment in which the communications network 720 is the Internet, for example, the server computer 800A can be a dedicated server computer operable to process and communicate data to and from the client computing devices 800B-800G via any of a number of known protocols, such as, hypertext transfer protocol (HTTP), file transfer protocol (FTP), or simple object access protocol (SOAP). Additionally, the networked computing environment 800 can utilize various data security protocols such as secured socket layer (SSL) or pretty good privacy (PGP). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary communications network 720. A participating user (not shown in FIG. 8) may request access to specific data and applications housed in whole or in part on the server computer 7800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage (NAS) and storage area networks (SAN) to realize application/data transactions.

It should be appreciated that the illustrative computing architecture shown in FIG. 7 and the illustrative distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Example 1

A computing device, comprising: a processor; a computer-readable storage medium in communication with the processor, the computer-readable storage medium having computer-executable instructions stored thereupon which, when executed by the processor, cause the processor to: receive a log file associated with a system or software, wherein the log file comprises log entries associated with operations of the system or software; automatically generate an object model comprising objects derived from the log entries, wherein at least one of the objects indicates properties of an instance of a component of the system or software, and wherein the objects form a hierarchy derived from parent-child relationships of instances of components of the system or software; determine if the object model satisfies one or more criteria specified by a rule; and perform a prescribed task according to the rule in response to determining that the object model satisfies the one or more criteria specified by the rule.

Example 2

The computing device according to Example 1, wherein at least one of the parent-child relationships is derived from a child log entry of the log entries that references a parent log entry of the log entries.

Example 3

The computing device according to Example 1, wherein the computer-executable instructions further cause the processor to: receive a report associated with an issue that occurred during execution of the system or software, wherein the report is associated with the log file, and wherein performing the prescribed task comprises assigning the report to an entity associated with the rule.

Example 4

The computing device according to Example 1, wherein the computer-executable instructions further cause the processor to: receive a report associated with an issue that occurred during execution of the system or software, wherein the report is associated with the log file, and wherein determining if the object model satisfies one or more criteria comprises identifying a root cause of the issue.

Example 5

The computing device according to Example 4, wherein performing the prescribed task comprises resolving the report based on the root cause analysis.

Example 6

The computing device according to Example 4, wherein the issue is caused by a defect in the system or software, a degraded or missing network connection used by the system or software, an insufficient amount of computing resources available to the system or software, a malicious attack directed towards the system or software, a malfunctioning or missing service consumed by the system or software, a malfunctioning peer computing device in communication with the system or software, or a feature suggestion reported by an end user of the system or software.

Example 7

The computing device according to Example 3, wherein the assigned report is augmented with information extracted from the object model.

Example 8

The computing device according to Example 1, wherein a log entry comprises a component name of one of the plurality of components, an object identifier associated with an instance of the component that generated the log entry, and a timestamp associated with a time when the log entry was generated, and wherein the hierarchy of objects is extracted from entries in the log file that define parent-child relationships by reference to an object identifier of another entry in the log file.

Example 9

The computing device according to Example 1, wherein the properties of the instance of the component are extracted from a plurality of log entries generated by the instance of the component.

Example 10

The computing device according to Example 1, wherein determining if the object model satisfies the one or more criteria specified by the rule includes navigating the hierarchy of objects to an object that corresponds to an instance of a particular component and applying the one or more criteria to the object that corresponds to the instance of the particular component.

Example 11

A method to be performed by a data processing system, the method comprising: parsing a log file generated by a software application to identify log entries; generating an object model comprising a hierarchy of objects derived from the log entries; determine if the object model satisfies one or more criteria included in a rule; and in response to determining that the object model satisfies the one or more criteria included in the rule, generating a report and assigning the report to an entity associated with the rule.

Example 12

The method according to Example 11, wherein the report describes an issue caused by a service invoked by the software application.

Example 13

The method according to Example 11, wherein one or more of the log entries: defines an object in the object model, defines a relationship between two objects in the object model, or adds a property and corresponding property value to an object in the object model.

Example 14

The method according to Example 11, wherein a runtime environment in which the computer application executes comprises a memory manager, wherein the memory manager defines an object identifier for each instance of a component of the computer application, wherein the memory manager re-allocates previously deallocated instances of a component, wherein a re-allocated instance of a component retains an object identifier of the previously deallocated instance of the component, and wherein a timestamp disambiguates whether one of the log entries refers to the deallocated instance of the component or the re-allocated instance of the component.

Example 15

The method according to Example 14, wherein disambiguating between the de-allocated instance and the re-allocated instance for a given log entry includes identifying whether the initialization of the de-allocated instance or the initialization of the re-allocated instance was closer in time to the given log entry.

Example 16

An apparatus for routing a user-submitted report to an entity, the apparatus comprising: means for parsing a log file generated by a computer application to identify log entries, wherein the log file is associated with the user-submitted report; means for generating an object model comprising a hierarchy of objects derived from the log entries; means for performing a root cause analysis on the object model, wherein the user-submitted report is augmented with a result of the root cause analysis; and means for processing the object model to determine if the object model satisfies one or more criteria included in a rule and to assign the user-submitted report to the entity associated with the rule in response to determining that object model satisfies the one or more criteria included in the rule.

Example 17

The apparatus according to Example 16, wherein the user-submitted report is received with the log file, and wherein the user-submitted report is generated in response to an error detected in the computer application.

Example 18

The apparatus according to Example 17, wherein the one or more criteria evaluates properties of an object in the object model, and wherein the user-submitted report is augmented with information from the object.

Example 19

The apparatus according to Example 16, wherein at least one of the log entries comprises an object identifier and a timestamp, wherein a plurality instances of a component are associated with the same object identifier, and wherein the means for generating the object model associates a log entry with one of the plurality of instances of the component based on the timestamp.

Example 20

The apparatus according to Example 16, wherein the means for generating the object model is further configured to apply one or more regular expressions to identify and extract values from one of the log entries, wherein the values in part define the hierarchy of objects, and wherein the values include properties of the objects in the hierarchy of objects.

Based on the foregoing, it should be appreciated that technologies for object model—based issue triage have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

The invention claimed is:

1. A computing device, comprising:
a processor;
a computer-readable storage medium in communication with the processor, the computer-readable storage medium having computer-executable instructions stored thereupon which, when executed by the processor, cause the processor to:
receive a log file associated with a system or software, wherein the log file comprises log entries associated with operations of instances of components of the system or software;
generate an object model comprising objects associated with instances of components of the system or software by:
generating an object of the object model in response to a first log entry that comprises an identifier associated with an instance of a component, and adding a property to the object in response to a second log entry that comprises the identifier;
wherein the objects form a hierarchy derived from parent-child relationships of instances of components of the system or software;
determine if the object model satisfies one or more criteria specified by a rule; and
perform a prescribed task according to the rule in response to determining that the object model satisfies the one or more criteria specified by the rule.

2. The computing device according to claim 1, wherein the computer-executable instructions further cause the processor to:
receive a report associated with an issue that occurred during execution of the system or software, wherein the report is associated with the log file, and wherein performing the prescribed task comprises assigning the report to an entity associated with the rule.

3. The computing device according to claim 1, wherein the computer-executable instructions further cause the processor to:
receive a report associated with an issue that occurred during execution of the system or software, wherein the report is associated with the log file, and wherein determining if the object model satisfies one or more criteria comprises identifying a root cause of the issue.

4. The computing device according to claim 3, wherein performing the prescribed task comprises resolving the report based on the root cause analysis.

5. The computing device according to claim 3, wherein the issue is caused by a defect in the system or software, a degraded or missing network connection used by the system or software, an insufficient amount of computing resources available to the system or software, a malicious attack directed towards the system or software, a malfunctioning or missing service consumed by the system or software, a malfunctioning peer computing device in communication with the system or software, or a feature suggestion reported by an end user of the system or software.

6. The computing device according to claim 2, wherein the assigned report is augmented with information extracted from the object model.

7. The computing device according to claim 1, wherein a log entry comprises a component name of one of the plurality of components, an object identifier associated with an instance of the component that generated the log entry, and a timestamp associated with a time when the log entry was generated, and wherein the hierarchy of objects is extracted from entries in the log file that define parent-child relationships by reference to an object identifier of another entry in the log file.

8. The computing device according to claim 1, wherein the computer-executable instructions further cause the processor to:
modify a value of the property in response to a third log entry that comprises the identifier associated with the instance of the component.

9. The computing device according to claim 1, wherein different instances of an individual component are associated with different identifiers.

10. A computer-implemented method, comprising:
receiving a log file associated with a system or software, wherein the log file comprises log entries associated with operations of instances of components of the system or software;
generating an object model comprising objects associated with instances of components of the system or software by:
generating an object of the object model in response to a first log entry that comprises an identifier associated with an instance of a component, and adding a property to the object in response to a second log entry that comprises the identifier;
wherein the properties of the instance of the component are extracted from a plurality of log entries generated by the instance of the component;
determining if the object model satisfies one or more criteria specified by a rule; and
performing a prescribed task according to the rule in response to determining that the object model satisfies the one or more criteria specified by the rule.

11. The method of claim 10, wherein a parent-child relationship is derived from a child log entry of the log entries that references a parent log entry of the log entries.

12. The method of claim 10, further comprising:
receiving a report associated with an issue that occurred during execution of the system or software, wherein the report is associated with the log file, and wherein performing the prescribed task comprises assigning the report to an entity associated with the rule.

13. The method of claim 10, further comprising:
receiving a report associated with an issue that occurred during execution of the system or software, wherein the report is associated with the log file, and wherein determining if the object model satisfies one or more criteria comprises identifying a root cause of the issue.

14. The method of claim 13, wherein performing the prescribed task comprises resolving the report based on the root cause analysis.

15. The method of claim 13, wherein the issue is caused by a defect in the system or software, a degraded or missing network connection used by the system or software, an insufficient amount of computing resources available to the system or software, a malicious attack directed towards the system or software, a malfunctioning or missing service consumed by the system or software, a malfunctioning peer computing device in communication with the system or software, or a feature suggestion reported by an end user of the system or software.

16. The method of claim 12, wherein the assigned report is augmented with information extracted from the object model.

17. An apparatus, comprising:
  means for receiving a log file associated with a system or software, wherein the log file comprises log entries associated with operations of instances of components of the system or software;
  means for generating an object model comprising objects associated with instances of components of the system or software by:
    generating an object of the object model in response to a first log entry that comprises an identifier associated with an instance of a component, and
    adding a property to the object in response to a second log entry that comprises the identifier,
  wherein the objects form a hierarchy derived from parent-child relationships of instances of components of the system or software;
  means for determining if the object model satisfies one or more criteria specified by a rule by navigating the hierarchy to an object that corresponds to an instance of a particular component and applying the one or more criteria to the object that corresponds to the instance of the particular component; and
  means for performing a prescribed task according to the rule in response to determining that the object model satisfies the one or more criteria specified by the rule.

18. The apparatus of claim 17, wherein a log entry comprises a component name of one of the plurality of components, an object identifier associated with an instance of the component that generated the log entry, and a timestamp associated with a time when the log entry was generated, and wherein the hierarchy of objects is extracted from entries in the log file that define parent-child relationships by reference to an object identifier of another entry in the log file.

\* \* \* \* \*